United States Patent
Lin

(10) Patent No.: US 8,568,933 B2
(45) Date of Patent: Oct. 29, 2013

(54) METAL-AIR FUEL CELL MODULE

(76) Inventor: Wen-Pin Lin, Taichung (TW)

( * ) Notice: Subject to any disclaimer, the term of this patent is extended or adjusted under 35 U.S.C. 154(b) by 369 days.

(21) Appl. No.: 12/907,648

(22) Filed: Oct. 19, 2010

(65) Prior Publication Data

US 2011/0117455 A1    May 19, 2011

(30) Foreign Application Priority Data

Nov. 17, 2009  (TW) ............................... 98138977 A

(51) Int. Cl.
*H01M 12/06* (2006.01)
(52) U.S. Cl.
USPC ........................................ 429/404; 429/407
(58) Field of Classification Search
USPC ................. 429/175, 403, 404, 407
See application file for complete search history.

(56) References Cited

U.S. PATENT DOCUMENTS

| 4,474,862 | A | * | 10/1984 | Buzzelli et al. | ............... | 429/403 |
| 5,362,577 | A | * | 11/1994 | Pedicini | ........................ | 429/403 |
| 5,447,805 | A | * | 9/1995 | Harats et al. | ............... | 429/407 X |
| 6,764,788 | B2 | * | 7/2004 | Robertson et al. | ........ | 429/175 X |

* cited by examiner

*Primary Examiner* — Stephen J. Kalafut

(57) ABSTRACT

A metal-air fuel cell module includes a cap seat connected detachably to a casing and having a plug portion extending into an inner accommodating space in the casing for plugging an opening in the casing; a conductive gas-diffusion sheet disposed in the casing for covering sealingly air inlets in the casing, and permitting air to pass through; an electrolyte solution filled in the inner accommodating space; a metal sheet disposed in the inner accommodating space and connected detachably to the plug portion of the cap seat; a first electrode plate mounted on the casing, extending into the inner accommodating space and in electrical contact with the gas-diffusion sheet; and a second electrode plate mounted in the cap seat, extending into the inner accommodating space and in electrical contact with the metal sheet.

11 Claims, 9 Drawing Sheets

US 8,568,933 B2

METAL-AIR FUEL CELL MODULE

CROSS-REFERENCE TO RELATED APPLICATION

This application claims priority of Taiwanese Application No. 098138977, filed on Nov. 17, 2009.

BACKGROUND OF THE INVENTION

1. Field of the Invention

The invention relates to a fuel cell, and more particularly to a metal-air fuel cell module.

2. Description of the Related Art

FIG. 1 illustrates an electrical toy car 1 that includes a car body 11, a drive unit 13, and a conventional metal-air fuel cell 12 connected electrically to the drive unit 13 for supplying electric power thereto.

The conventional metal-air fuel cell 12 includes: a stack structure that constitutes a metal layer 121 serving as an anode, a gas-diffusion layer 122 serving a cathode, and an isolating layer 123 disposed between the metal layer 121 and the gas-diffusion layer 122; a cover film 124 for covering the stack structure, and a clamper 125 for clamping an assembly of the cover film 124 and the stack structure.

The fuel cell 12 must be disassembled to coat an electrolyte (not shown) over the isolating layer 123 prior to use, which is inconvenient. In addition, misoperation may cause a short circuit to occur between the gas-diffusion layer 122 and the metal layer 121. Furthermore, the amount of the electrolyte coated over the isolating layer 123 is very small, and the electric power produced by the fuel cell 12 is limited and cannot conform user's requirements.

SUMMARY OF THE INVENTION

Therefore, an object of the present invention is to provide a metal-air fuel cell module that can overcome the aforesaid disadvantages of the prior art.

According to the present invention, there is provided a metal-air fuel cell module capable of supplying electric power to an electrical appliance. The fuel cell module comprises:
a casing configured with an inner accommodating space, and having a top end formed with an opening, and a side surface formed with a plurality of air inlets, the opening and the air inlets being in spatial communication with the inner accommodating space;
a cap seat connected detachably to the casing, and having a plug portion that extends downwardly into the inner accommodating space through the opening in the top end of the casing for plugging the opening;
a power unit including
a conductive gas-diffusion sheet disposed in the casing for covering sealingly the air inlets, and permitting air to pass through,
an electrolyte solution filled in the inner accommodating space in the casing, and
a metal sheet disposed in the inner accommodating space in the casing and mounted detachably to the cap seat;
a first electrode plate mounted on the casing and having an end portion that extends into the inner accommodating space in the casing and that is in electrical contact with the gas-diffusion sheet; and
a second electrode plate mounted in the cap seat, spaced apart from the first electrode plate, and having an end portion that extends into the inner accommodating space in the casing and that is in electrical contact with the metal sheet.

The power unit produces the electrode power in response to electrolytic oxidation and reduction such that the electric power produced by the power unit is supplied to the electrical appliance when the electrical appliance is connected electrically between the first and second electrode plates.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 2 to 5, the preferred embodiment of a metal-air fuel cell module according to the present invention is shown to include a transparent casing 3, a cap seat 5, a power unit, a first electrode plate 7, and a second electrode plate 8.

Figure 1:
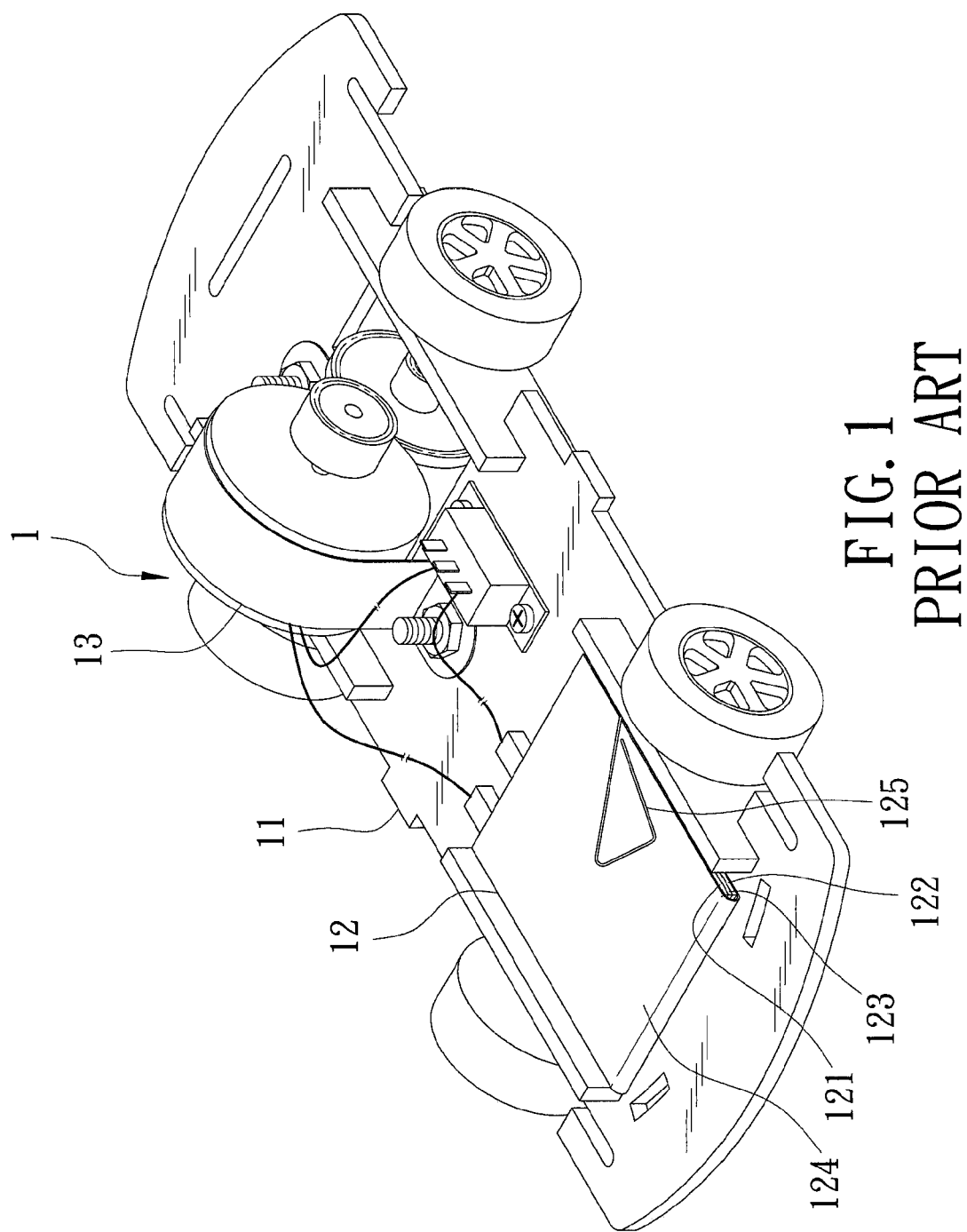
FIG. 1 is a perspective view showing a conventional metal-air fuel cell mounted on an electrical toy car.
Figure 2:
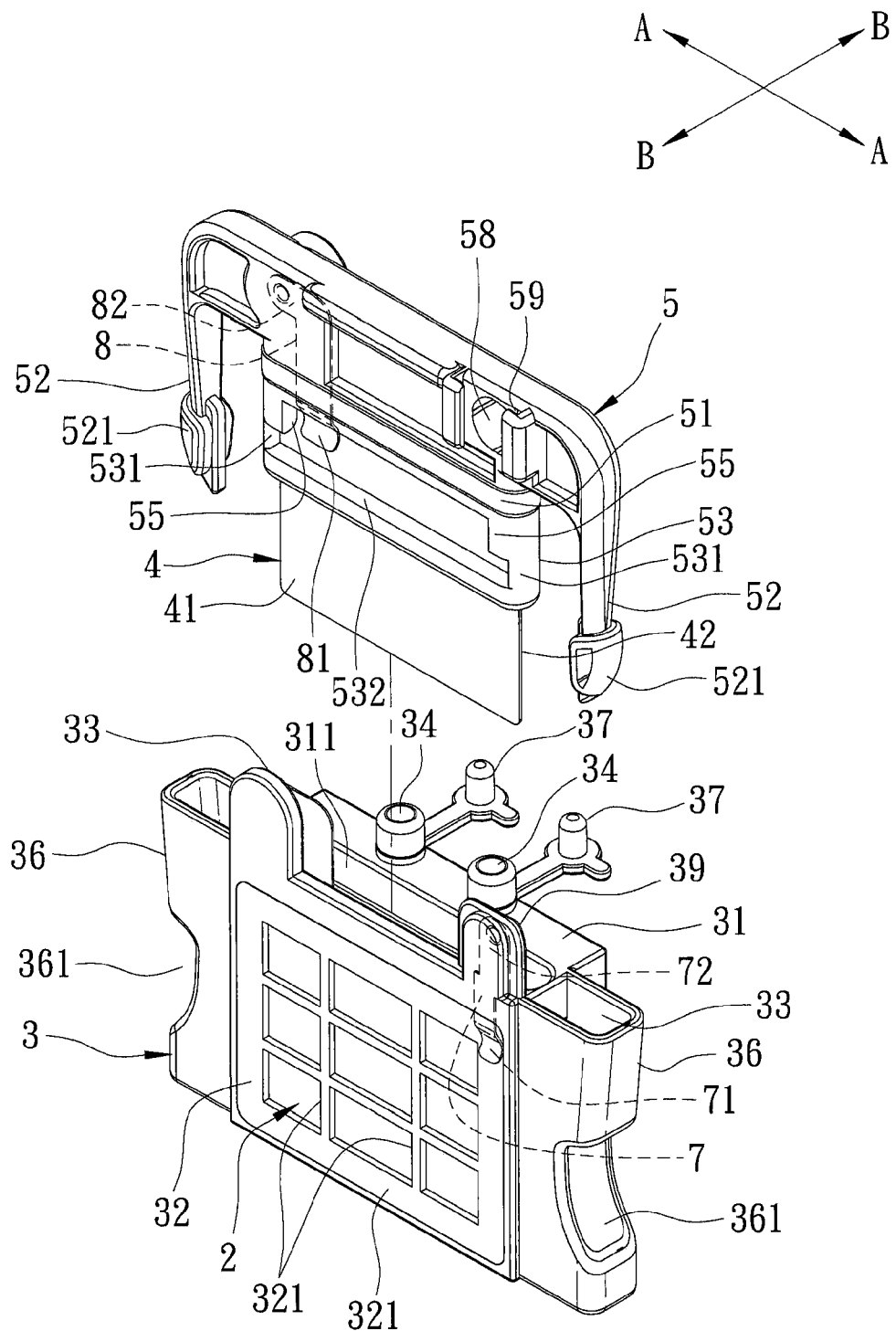
FIG. 2 is a partially exploded perspective view showing the preferred embodiment of a metal-air fuel cell module according to the present invention.
Figure 3:
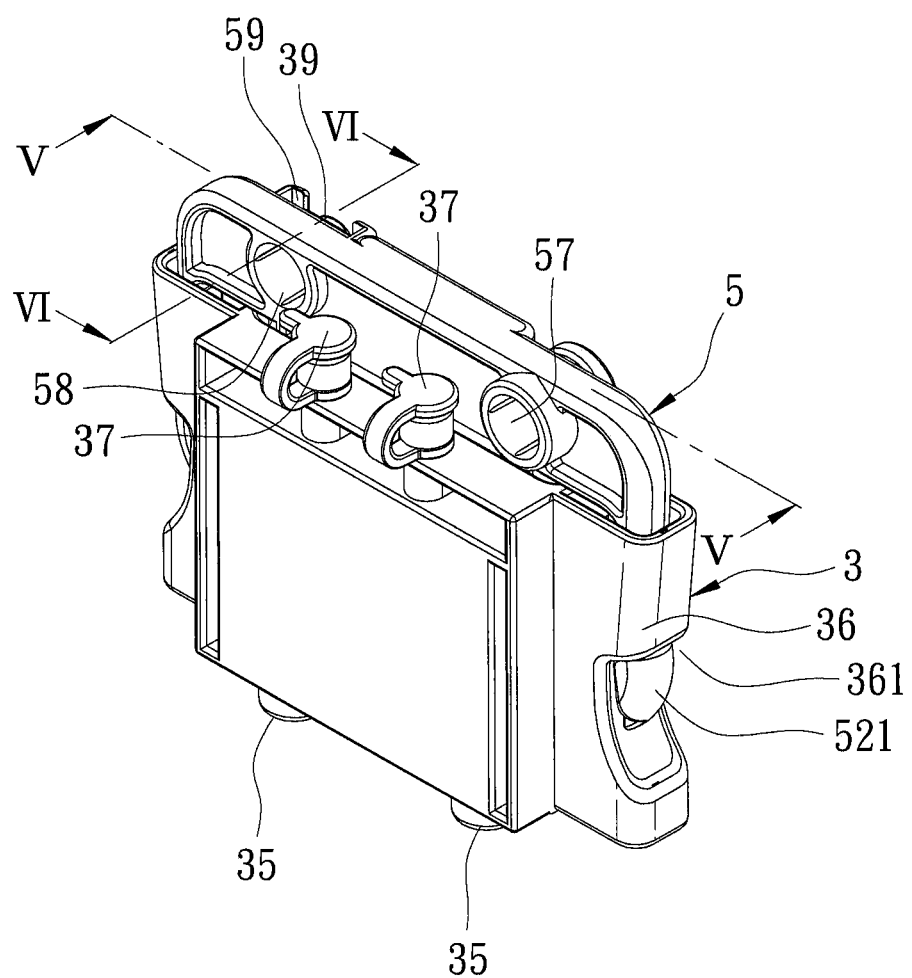
FIG. 3 is an assembled perspective view showing the preferred embodiment.
Figure 4:
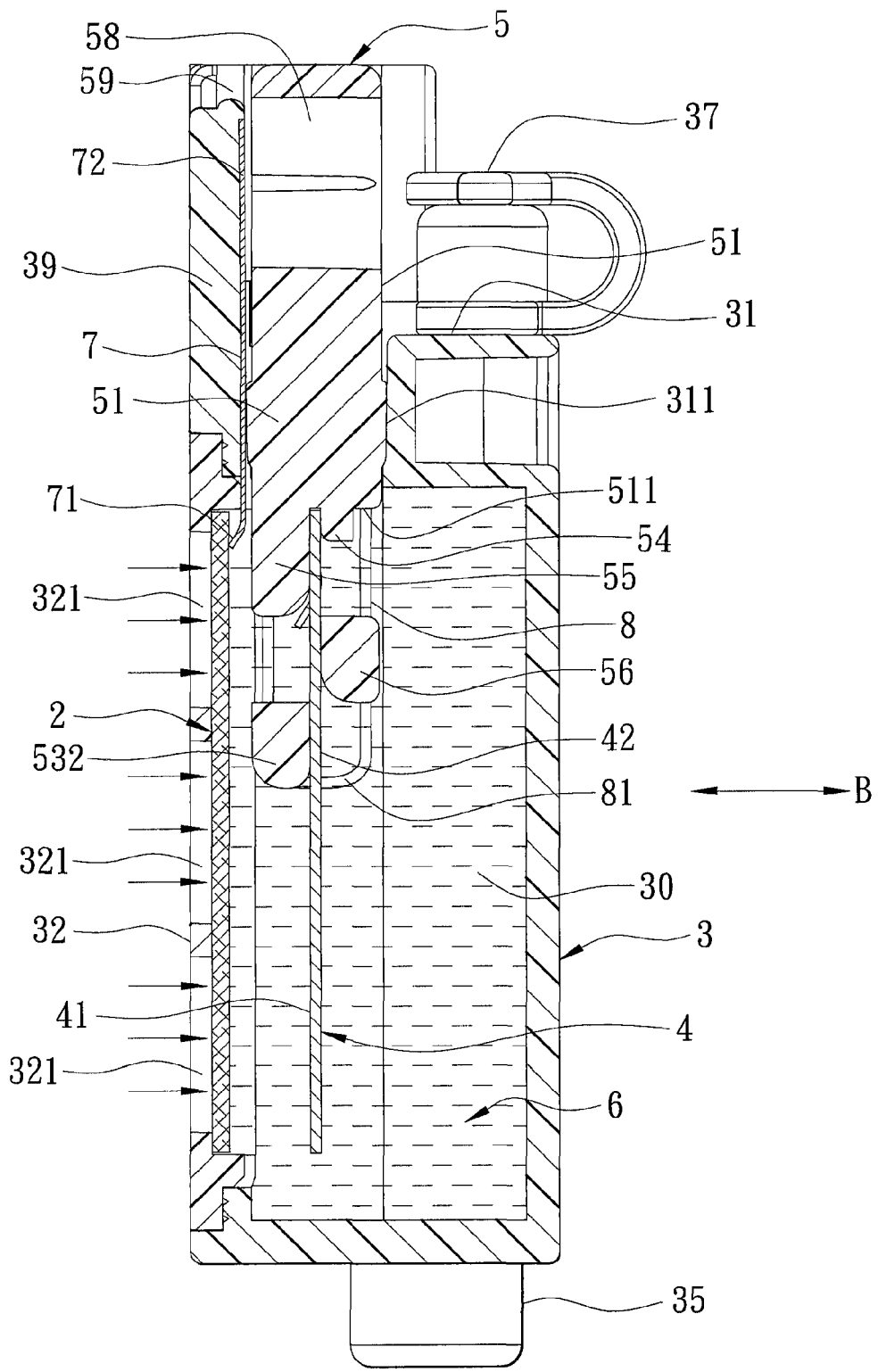
FIG. 4 is a schematic sectional view of the preferred embodiment taken along line VI-VI in FIG. 3.

The casing 3 is configured with an inner accommodating space 30 (see FIG. 4). As shown in FIG. 2, the casing 3 has a top end 31, a side surface 32, and opposite lateral sides in a first direction (A). The top end 31 is formed with an opening 311 in spatial communication with the inner accommodating space 30. The side surface 32 is formed with a plurality of air inlets 321 in spatial communication with the inner accommodating space 30. In this embodiment, each lateral side is formed with an insertion groove 33 extending downwardly from the top end 31. The insertion groove 33 in each lateral side of the casing 3 is defined by a looped wall 36 that is formed with an engaging hole 361. In addition, the top end 31 is formed with two inlet holes 34 in spatial communication with the inner accommodating space 30, and two plugs 37 for plugging respectively the inlet holes 34. The casing 3 further has a positioning lug 39 extending upwardly from the top end 31.

Figure 5:
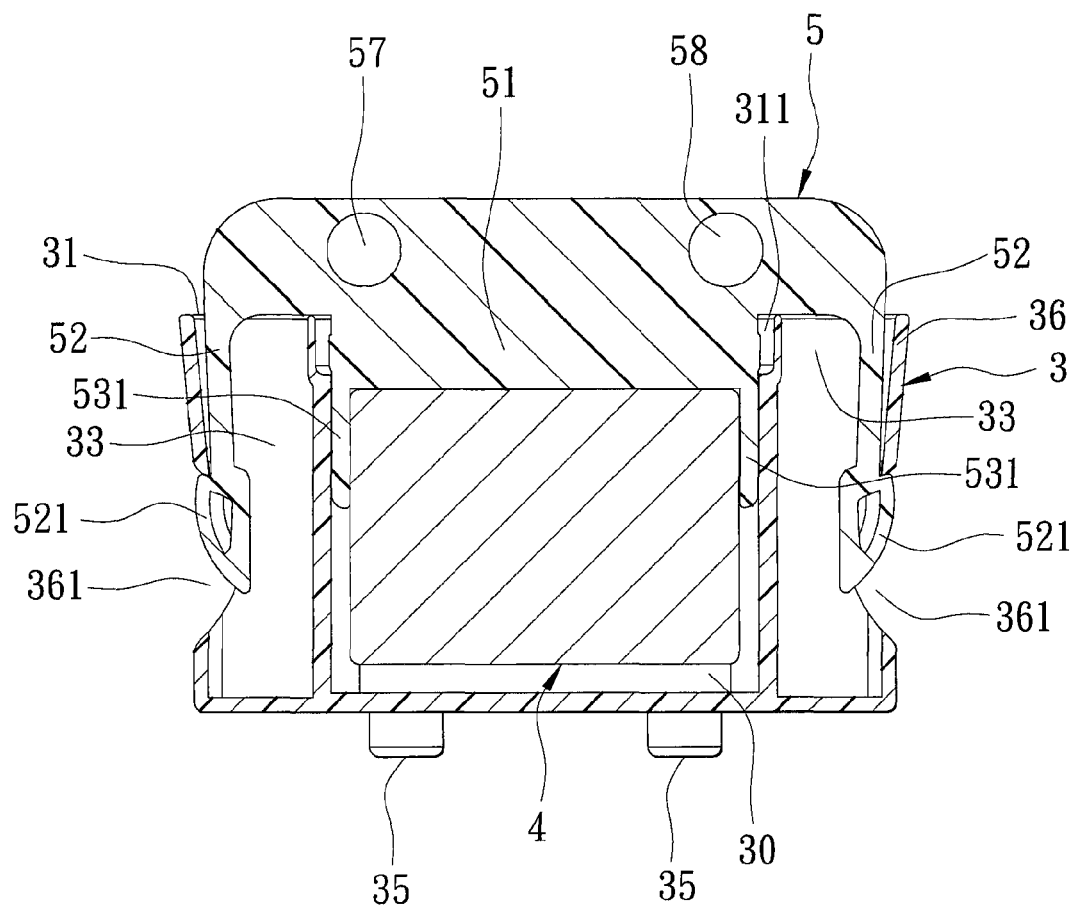
FIG. 5 is a schematic sectional view of the preferred embodiment taken along line V-V in FIG. 3.

The cap seat 5 is connected detachably to the casing 3, and has a plug portion 51, and a pair of downwardly extending connecting arms 52. The plug portion 51 extends downwardly into the inner accommodating space 30 in the casing 3 through the opening 311 in the top end 31 of the casing 3 for plugging the opening 311, as best shown in FIG. 4. The connecting arms 52 are opposite to each other in the first direction (A). Each connecting arm 52 extends into and engages releasably the insertion groove 33 in a corresponding lateral side of the casing 3. In this embodiment, each connecting arm 52 has an enlarged end portion 521 extending into and engaging releasably the engaging hole 361 in the looped wall 36 of the corresponding lateral side of the casing 3, as best shown in FIG. 5. In addition, the cap seat 5 is formed with a vertically extending positioning groove 59 engaging slidably the positioning lug 39 of the casing 3.

Referring to FIG. 4, the power unit includes a conductive gas-diffusion sheet 2, an electrolyte solution 6, and a metal sheet 4. The gas-diffusion sheet 2 is disposed in the casing 3 for covering sealingly the air inlets 321 and permitting air to pass through. The electrolyte solution 6 is filled in the inner accommodating space 30 in the casing 3. The metal sheet 4 is disposed in the inner accommodating space 30 in the casing 3, and is mounted detachably to the cap seat 5. The metal sheet 4 has a first side surface 41, and a second side surface 42 opposite to the first side surface 41 in a second direction (B) that is transverse to the first direction (A). In this embodiment, the gas-diffusion sheet 2 is made of carbon, and the metal sheet 4 is made of aluminum (Al) or magnesium (Mg).

Figure 6A:
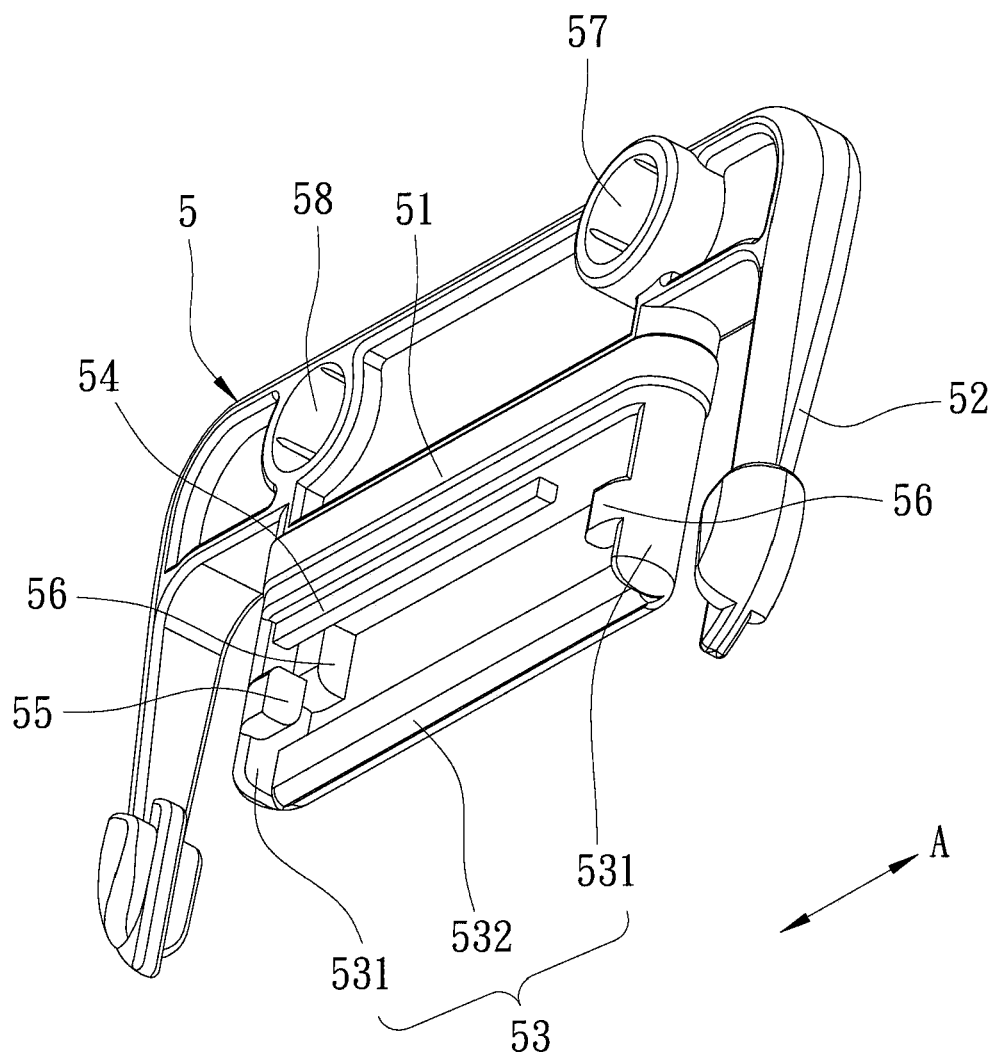
FIGS. 6a and 6b are perspective views showing a cap seat of the preferred embodiment.
Figure 6B:
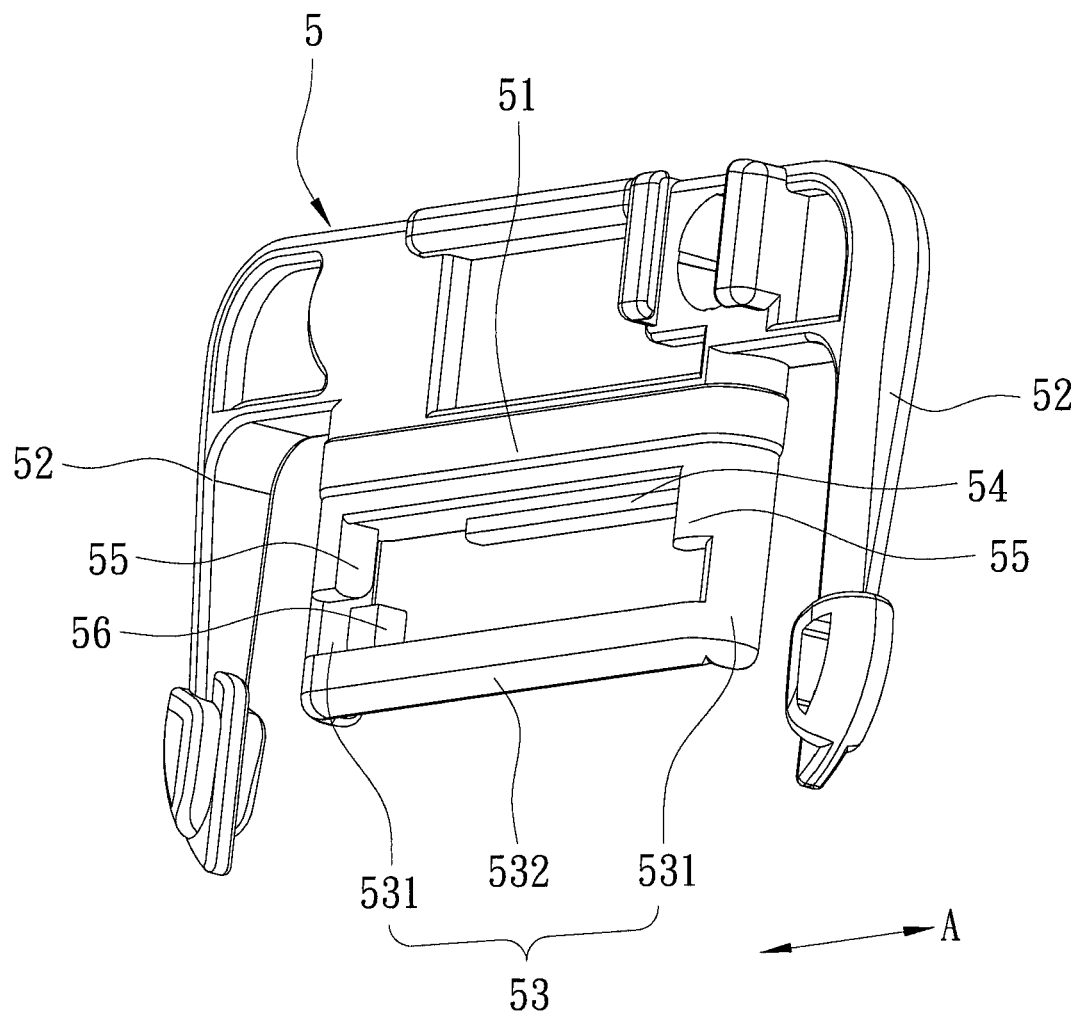

In this embodiment, referring further to FIGS. 6a and 6b, the cap seat 5 further has a clamping unit for clamping the metal sheet 4. The clamping unit includes a U-shaped frame 53, an elongate first positioning block 54, two second positioning blocks 55, and two third positioning blocks 56. The U-shaped frame 53 is defined by two lateral plates 531 opposite to each other in the first direction (A) and extending downwardly from a bottom surface 511 of the plug portion 51 such that the metal sheet 4 is clamped between the lateral plates 331 in the first direction (A) (see FIG. 5), and an intermediate rod 532 interconnecting the lateral plates 531 and abutting against the first side surface 41 of the metal sheet 4. The first positioning block 54 is formed on the bottom surface 511 of the plug portion 51 and extends in the first direction (A). The first positioning block 54 abuts against the second side surface 42 of the metal sheet (see FIG. 4). The second positioning blocks 55 extend downwardly from the bottom surface 511 of the plug portion 51, and are opposite to each other in the first direction (A). In addition, the second positioning blocks 55 are spaced apart from the first positioning block 54 in the second direction (B), and abut against the first side surface 42 of the metal sheet 4. The third positioning blocks extend respectively from the lateral plates 531 of the U-shaped frame 53 toward each other in the first direction (A), and are disposed between the second positioning blocks 55, and the intermediate rod 532 of the U-shaped frame 53. The third positioning blocks 56 abut against the second side surface 42 of the metal sheet 4. Thus, the metal sheet 42 is clamped by the first positioning block 54, the second positioning blocks 55, the third positioning blocks 56, and the intermediate rod 532 of the U-shaped frame 53 in the second direction (B) (see FIG. 4).

The first electrode plate 7 is mounted on the casing 5, and has an end portion 71 that extends into the inner accommodating space 30 in the casing 3 and that is in electrical contact with the gas-diffusion sheet 2. In addition, the first electrode plate 7 extends upwardly along and is attached to the positioning lug 39.

The second electrode plate 8 is mounted in the cap seat 5, and is spaced apart from the first electrode plate 7. The second electrode plate 8 has an end portion 81 that extends into the inner accommodating space 30 in the casing 3 and that is in electrical contact with metal sheet 4.

In this embodiment, the cap seat 5 is formed with a first terminal-mounting hole 57 and a second terminal-mounting hole 58. The first terminal-mounting hole 57 is formed so that a part 82, i.e., an upper portion, of the second plate 8 is exposed through the first terminal-mounting hole 57. The second terminal-mounting hole 58 is a through hole which is in spatial communication with the positioning groove 59, and is formed so that a part 72, i.e., an upper end portion, is exposed through the second terminal-mounting hole 58.

For the power unit, the metal sheet 4 and the gas-diffusion sheet 2 serve respectively as an anode and a cathode of the electrolytic reaction such that the power unit produces electric power in response to electrolytic oxidation at the metal sheet 4 and electrolytic reduction at the gas-diffusion sheet 2. In this case, the first electrode plate 7 and the second electrode plate 8 serve respectively as a positive electrode and a negative electrode of the metal-air fuel cell module. Thus, the electric power produced by the preferred embodiment can be supplied to an electrical appliance when the electrical appliance is connected electrically between the first and second electrode plates 7, 8. In other words, the electric power is provided in the form of a current that flows from the first electrode plate 7 through the electrical appliance and back to the second electrode plate 8.

Figure 7:
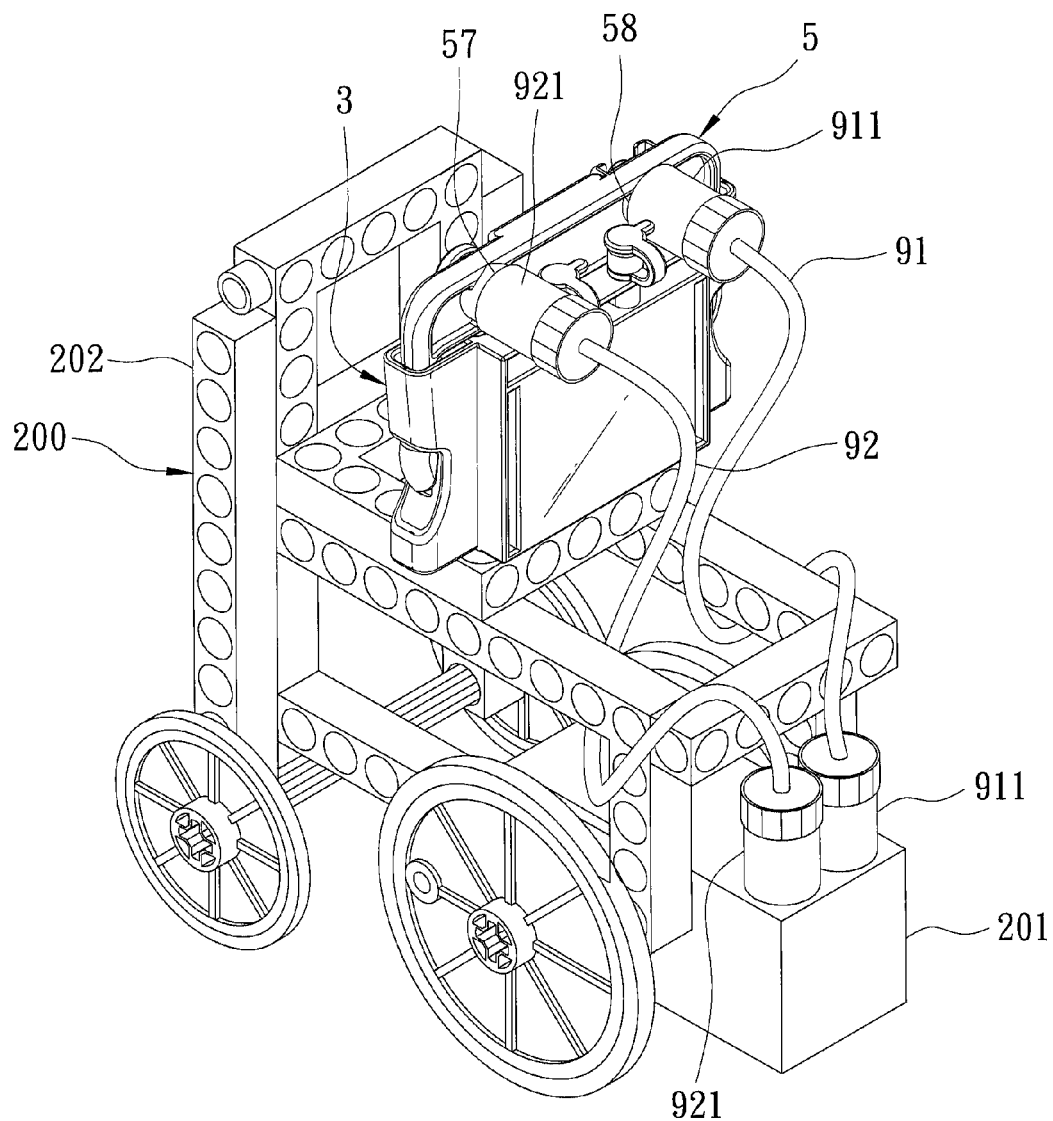
FIG. 7 is a perspective view showing an electrical toy car provided with the preferred embodiment.

Referring to FIG. 7, the metal-air fuel cell module is shown to supply the electric power to an electrical toy car 200 serving as the electrical appliance. The electrical toy car 200 includes a car body 202 constituting a plurality of combination bricks, and a motor brick 201 for driving rotation of wheels mounted on the car body 202. The metal-air fuel cell module further includes first and second terminal wires 91, 92. Each of the first and second terminal wires 91, 92 is connected electrically between a corresponding one of the first and second electrode plates 7, 8, and the motor brick 201 of the electrical toy car 200. The first terminal wire 91 has opposite insertion end portions 911, one of which is inserted into the second terminal-mounting hole 58 in the cap seat 5 and in electrical contact with the part 72 of the first electrode plate 7, and the other of which is inserted into the motor brick 201 and in electrical contact with a drive motor (not shown) in the motor brick 201. The second terminal wire 92 has opposite insertion end portions 921, one of which is inserted into the first terminal-mounting hole 57 in the cap seat 5 and in electrical contact with the part 82 of the second electrode plate 8, and the other of which is inserted into the motor brick 201 and in electrical contact with the drive motor. In addition, the casing 5 further has two connecting members 35 formed on a bottom end thereof, as shown in FIG. 5, and adapted to be connected to a corresponding brick of the car body 202.

In one example, when the metal sheet 4 is made of Al and Mg, and has a size of 0.5 mm×40 mm×30 mm, the metal-air fuel cell module of the present invention can produce electric power of about 1.4~1.8V and 600~700 mAh. In another example, when the metal sheet 4 is in the form of multilayer aluminum foil, and has a size of 0.72 mm×270 mm×80 mm, the metal-air fuel cell module of the present invention can produce electric power of about 0.75~0.85V and 53~60 mAh. In a further example, when the metal sheet 4 is made of Al, and has a size of 0.8 mm×40 mm×30 mm, the metal-air fuel cell module of the present invention can produce electric power of about 0.72~0.83V and 50~60 mAh.

Figure 8:
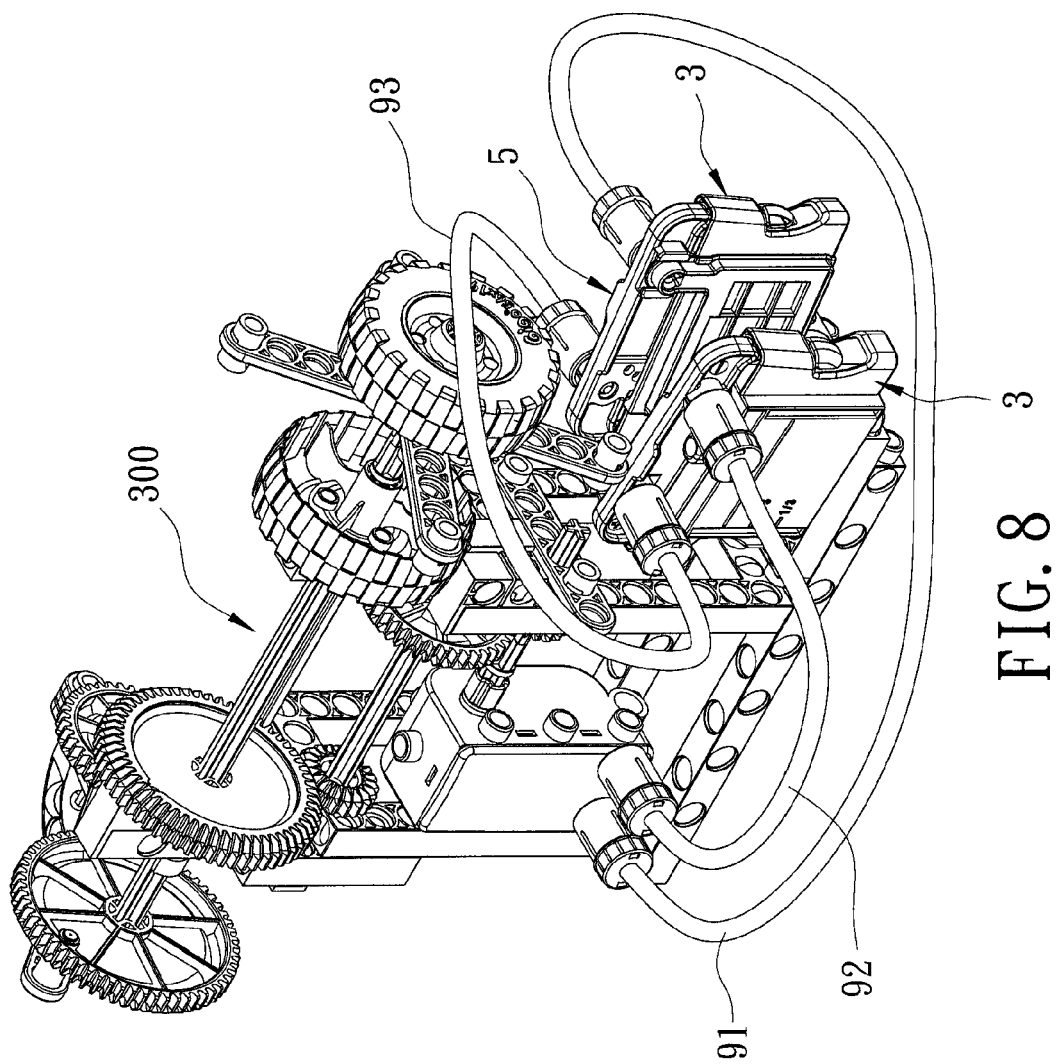
FIG. 8 is a perspective view showing an electrical combination toy provided with a series connection of two metal-air fuel cell modules of the preferred embodiment.

Referring to FIG. 8, two metal-air fuel cell modules of the preferred embodiment connected in series are shown to be mounted on an electrical combination toy 300 that serves as the electrical appliance. A third terminal wire 93 is used to interconnect electrically the positive electrode of one metal-air fuel cell module and the negative electrode of the other metal-air fuel cell module.

In sum, for the metal sheet 4 and the electrolyte solution 6 used as fuel, the metal sheet 4 can be easily obtained and can be easily replaced by detaching the cap seat 5 from the casing 3, and the electrolyte solution 6 can be easily filled in the inner accommodating space 30 via the inlet holes 34. Furthermore, the metal-air fuel cell module can be easily assembled and connected mechanically and electrically to the electrical appliance.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A metal-air fuel cell module capable of supplying electric power to an electrical appliance, said metal-air fuel cell module comprising:
    a casing configured with an inner accommodating space, and having a top end formed with an opening, and a side surface formed with a plurality of air inlets, said opening and said air inlets being in spatial communication with said inner accommodating space;
    a cap seat connected detachably to said casing, and having a plug portion that extends downwardly into said inner accommodating space through said opening in said top end of said casing for plugging said opening;
    an power unit including
        a conductive gas-diffusion sheet disposed in said casing for covering sealingly said air inlets and permitting air to pass through,
        an electrolyte solution filled in said inner accommodating space in said casing, and
        a metal sheet disposed in said inner accommodating space in said casing and mounted detachably to said cap seat;
    a first electrode plate mounted on said casing and having an end portion that extends into said inner accommodating space in said casing and that is in electrical contact with said gas-diffusion sheet; and
    a second electrode plate mounted in said cap seat, spaced apart from said first electrode plate, and having an end portion that extends into said inner accommodating space in said casing and that is in electrical contact with said metal sheet;
    wherein said power unit produces the electrode power in response to electrolytic oxidation and reduction such that the electric power produced by said power unit is supplied to the electrical appliance when the electrical appliance is connected electrically between said first and second electrode plates.

2. The metal-air fuel cell module as claimed in claim 1, wherein said casing is transparent.

3. The metal-air fuel cell module as claimed in claim 1, wherein said top end of said casing is formed with at least one inlet hole in spatial communication with said inner accommodating space, and at least one plug for plugging said inlet hole.

4. The metal-air fuel cell module as claimed in claim 1, wherein:
    said casing has opposite lateral sides in a first direction, each of said lateral sides being formed with an insertion groove that extends downwardly from said top end of said casing; and
    said cap seat further has a pair of downwardly extending connecting arms opposite to each other in the first direction, each of said connecting arms inserted into and engaging releasably said insertion groove in a corresponding one of said lateral sides of said casing.

5. The metal-air fuel cell module as claimed in claim 4, wherein:
    each of said insertion grooves is defined by a looped wall formed with an engaging hole; and
    each of said connecting arms has an enlarged end portion extending into and engaging releasably said engaging hole in said looped wall of the corresponding one of said lateral sides of said casing.

6. The metal-air fuel cell module as claimed in claim 4, wherein said cap seat further has a clamping unit for clamping said metal sheet, said clamping unit including:
    a U-shaped frame defined by two lateral plates opposite to each other in the first direction and extending downwardly from a bottom surface of said plug portion such that said metal sheet is clamped between said lateral plates in the first direction, and an intermediate rod interconnecting said lateral plates and abutting against a first side surface of said metal sheet;
    an elongate first positioning block formed on said bottom surface of said plug portion, extending in the first direction and abutting against a second side surface of said metal sheet opposite to said first side surface in a second direction that is transverse to the first direction;
    two second positioning blocks extending downwardly from said bottom surface of said plug portion, opposite to each other in the first direction, spaced apart from said first positioning block in the second direction, and abutting against said first side surface of said metal sheet; and
    two third positioning blocks extending respectively from said lateral plates of said U-shaped frame toward each other in the first direction, disposed between said second positioning blocks and said intermediate rod of said U-shaped frame, and abutting against said second side surface of said metal sheet;
    said metal sheet being clamped by said first positioning block, said second positioning blocks, said third positioning blocks, and said intermediate rod of the U-shaped frame in the second direction.

7. The metal-air fuel cell module as claimed in claim 1, wherein said casing is provided with at least one connecting member adapted to be connected to the electrical appliance.

8. The metal-air fuel cell module as claimed in claim 7, wherein said casing has a bottom end formed with said connecting member.

9. The metal-air fuel cell module as claimed in claim 1, wherein said cap seat is formed with a first terminal-mounting hole such that a part of said second electrode plate is exposed through said first terminal-mounting hole.

10. The metal-air fuel cell module as claimed in claim 9, wherein:
    said casing further has a positioning lug extending upwardly from said top end;
    said first electrode plate extending upwardly along and attached to said positioning lug; and
    said cap seat is formed with a vertically extending positioning groove engaging slidably said positioning lug of said casing, and a second terminal-mounting hole in spatial communication with said positioning groove such that a part of said first electrode plate is exposed through said second terminal-mounting hole.

11. The metal-air fuel cell module as claimed in claim 10, further comprising first and second terminal wires, each of which is connected electrically between a corresponding one of said first and second electrode plates, and the electrical appliance;

wherein said first terminal wire includes an insertion end portion inserted into said second terminal-mounting hole in said cap seat and in electrical contact with said part of said first electrode plate; and wherein said second terminal wire includes an insertion end portion inserted into said first terminal-mounting hole in said cap seat and in electrical contact with said part of said second electrode plate.

* * * * *